Figure 1:
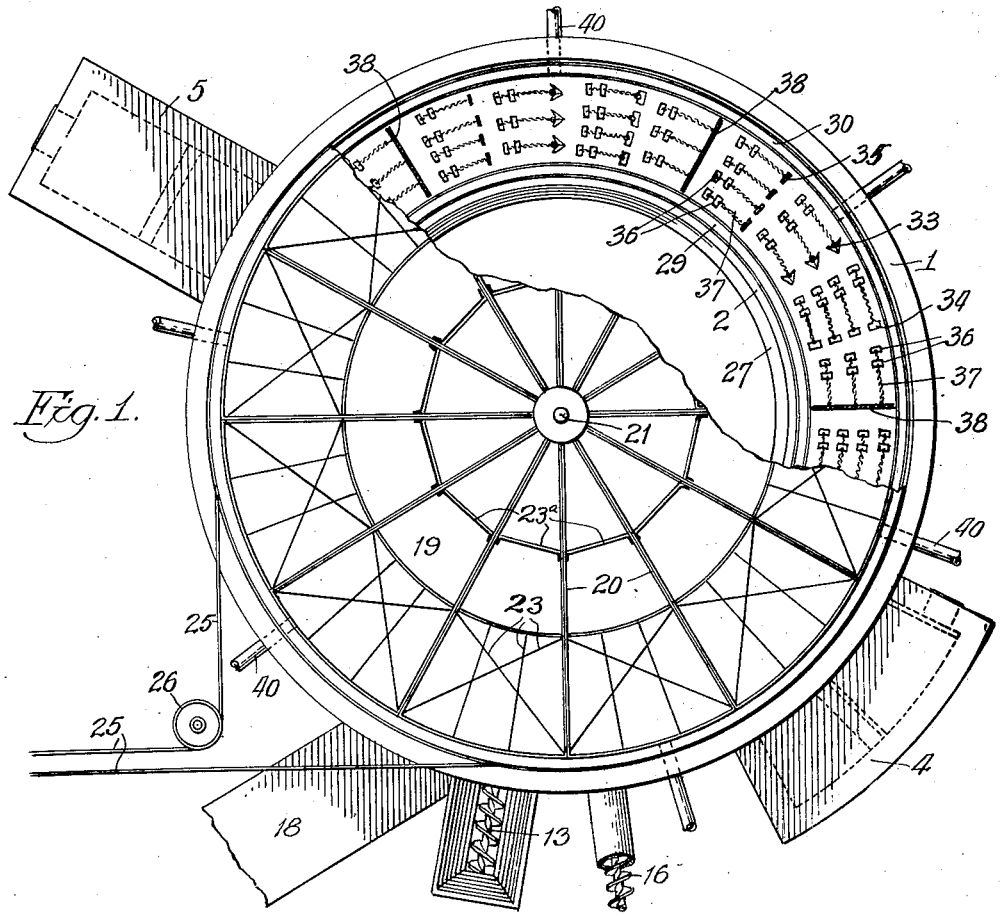

May 27, 1930.   H. G. LYKKEN   1,760,244
HEAT TREATMENT KILN
Filed Jan. 2, 1925   2 Sheets-Sheet 1

Inventor:
Henry G. Lykken,
By Wallace R. Lane.
Atty.

May 27, 1930.  H. G. LYKKEN  1,760,244
HEAT TREATMENT KILN
Filed Jan. 2, 1925   2 Sheets-Sheet 2
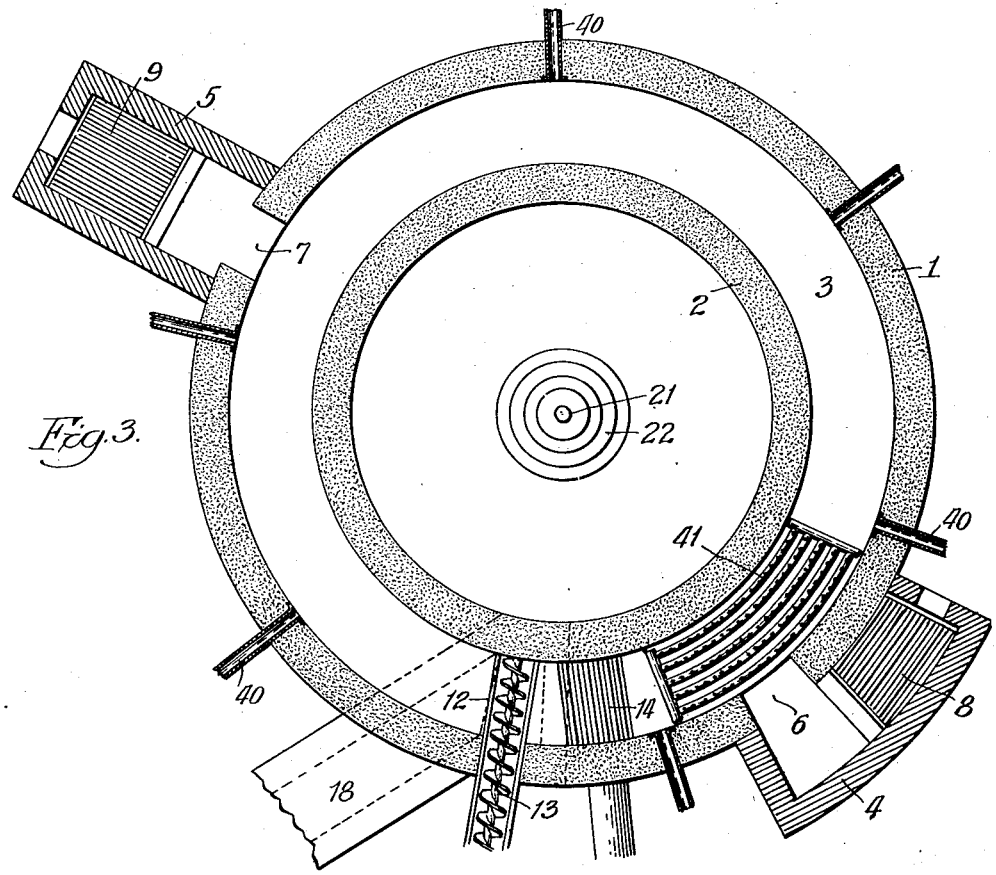
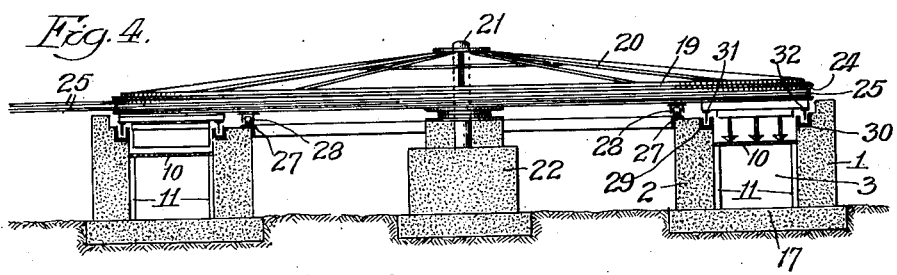
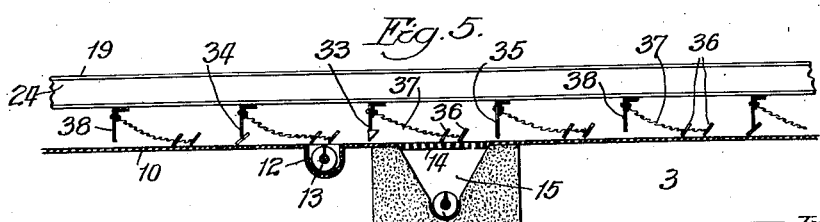
Inventor:
Henry G. Lykken,
by Wallace R. Lane.
Atty.

Patented May 27, 1930

1,760,244

UNITED STATES PATENT OFFICE

HENRY G. LYKKEN, OF MINNEAPOLIS, MINNESOTA

HEAT-TREATMENT KILN

Application filed January 2, 1925. Serial No. 38.

The present invention relates to heat treatment of materials and more particularly to such treatment as carried out in a kiln.

Among the objects of the invention are to provide a novel kiln for the heat treatment of various materials, such as the drying of coal, whether or not in the granular or pulverized form; the distillation of coal, oil shale and other similar substances; to combining of substances for segregating and recovering gases and liquid volatiles; the calcining of gypsum; the burning of limestone for recovering carbon dioxide gas; and the treatment or roasting of various ores, chemical substances and mixtures; the reduction of iron ores, such as limonite and hematite to magnetite for magnetic separations; to provide for a novel sealing means for isolating the reaction placed on the hearth from the exterior; to provide for a novel means for the operating of the feeding and stirring device or cover of the kiln, preferably by the use of a cable wrapped around the periphery of the device or cover so that a more efficacious drive may be effected at the locus of resistance; to provide for separated or segregated compartments for the different treatments of the materials therein, the compartments being preferably movable over the hearth so that the different treatments may be successive over the different parts of the hearth; to provide for the introduction of various substances, such as gases, or the removal of the products of drying, evaporation or distillation from the space above the hearth preferably from the compartments above mentioned; to provide novel means for the rotating of the cover or roof of the kiln, preferably about a central truncheon and upon rollers supporting the cover structure; to provide means for stirring and facilitating the conduction of heat into the materials being treated, such means preferably being metal elements contacting with the hearth for receiving heat therefrom and also preferably connected to flexible drag elements capable of writhing and contorting so as to thoroughly stir the materials and expose new surfaces thereof for reaction; to provide for the introduction of steam or gases under pressure into the materials undergoing treatment and at any point of the reaction thereof; to provide a novel method of treating low or non-magnetic ores, such as limonite, hematite and the like, for rendering the same magnetic and admitting to magnetic separation; to treat such magnetic ores with carbonaceous or cellulose materials, such as lignite, sawdust, granulated wood refuse, peat and ground or pulverized coal and the like whereby volatile materials may be produced and which may be used in the heat treatment as a fuel and also to evolve oxygen which together with substances that may be introduced as determined upon and desired, may oxidize the ore to leave the magnetic constituent in such a state as to admit magnetic separation; and to provide for such other advantages, capabilities and objects as will later appear and are inherently possessed by the invention.

Figure 2:
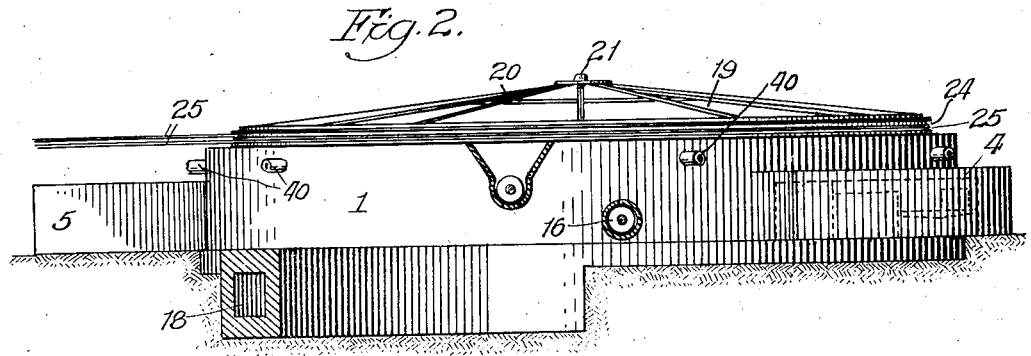

Referring to the drawings illustrating a preferred embodiment of kiln designed and adapted to carry out the process, Figure 1 is a top plan view of the kiln constructed in accordance with the invention and with a part of the roof or cover thereof broken away to show the interior of the kiln; Figure 2 is a side view in elevation, with parts broken away, of the same; Figure 3 is a horizontal sectional view taken through the kiln; Figure 4 is a transverse vertical sectional view of the same; and, Figure 5 is a vertical sectional view of a part of the same.

Referring now more in detail to the drawings, the kiln selected to illustrate the invention is shown as comprising a body of refractory material, concrete or the like or similar construction having an outer and inner wall 1 and 2 of annular form and providing therebetween an annular space or channel 3 communicating with heating devices 4 and 5 by way of openings 6 and 7, the heating devices 4 and 5 having suitable grates 8 and 9 for supporting any desired fuel. It is to be understood that although the heating devices are shown as furnaces for the use of fuel on grates that the invention is not to be limited thereto as any other mode of supplying heat to the kiln may be adopted.

Within the channel 3 is supported an annular heating plate or hearth 10 preferably of metal suitably supported in the channel 3 as by means of uprights 11 located at the sides of the channel 3. The hearth is of annular form and at one point thereof has a depressed portion or trough 12 extending to the exterior of the kiln and having a feed screw or spiral 13 adapted to be rotated by any suitable source of power and to operate to feed the materials to be treated into the trough 12 and upon the hearth 10 so that the materials may be fed along the surface of the hearth as will be more fully explained hereinafter. The trough 12 and screw 13 constitute the charging means for the material upon the hearth. After the material has been moved or fed slowly over the surface of the hearth and has been treated, the remaining material or residue will then arrive at another point of the hearth, preferably adjacent to the charging means 12 and 13, and the material will fall through the grate or grid 14 into a hopper 15 in the bottom of which operates a screw or spiral 16 extending to the exterior of the kiln and operative to feed the residue material from the kiln, this mechanism constituting the discharge part of the device.

The hearth 10 is preferably located a given distance above the bottom 17 of the kiln so as to provide a space or passage for the products of combustion from the heating devices 4 and 5, the same passing through the passage beneath the hearth and giving up heat thereto and then passing out through a flue 18 and to a suitable stack (not shown). From the above it will be apparent that the hearth will be heated at the greatest temperature near the openings 6 and 7 and at progressively lesser temperatures away from such openings.

The treatment of the materials occurs in the space above the hearth and to confine such space, the device is provided with a cover or roof 19 which may be of circular or of annular form and composed of flanged sectors having the radial flanges 20 thereof secured together in any suitable manner, the vertices of the sectors being secured to the vertical truncheon 21 supported in a central post 22 which may be formed of concrete or similar material as desired. To aid in supporting the cover 19, truss and brace members 23 and 23ª may be secured to flanges of the sectors, as shown. At the periphery of the cover is provided a groove 24 in which is wrapped or wound a driving cable 25 leading to a suitable driving device, such as a motor, engine, hoisting machine or the like, one section of the cable passing over a pulley 26. From the above it will be apparent that the cover is caused to rotate by the driving of the cable wrapped about the periphery thereof and at such a distance from the center of the cover so that the least effort is required for the greatest work to be produced in the rotating of the cover. In order that the cover may be supported at a proper distance above the hearth the inner wall 2 is provided with a track 27 upon which ride rollers 28 secured in any suitable manner at intervals to the cover 19, as clearly shown in the drawings.

In order to confine the reaction space above the hearth from the exterior of the device, a sealing device is provided, and this device comprises inner and outer sealing channels 29 and 30 respectively supported by or imbedded in the upper portions of the walls 2 and 1 as clearly shown in Figure 4 of the drawings. These channels contain fluidal materials such as sand, powder, liquids of any kind, to act as a seal. From the cover 19 depend annular flanges or fins 31 and 32 which respectively extend into the channels 29 and 30 and the sealing material therein. It will thus be apparent that the gases or other fluids within the space confined by the cover, hearth and sealing means, will be maintained independent and separated from the exterior of the kiln.

Extending downwardly in dependent relation from the bottom of the cover 19 are provided suitable stirring devices such as plows 33, hoes 34 and rakes 35 such that the same will extend into the material to be treated at suitable depths so that as the cover is caused to rotate and the stirring devices are moved over the hearth, the materials may be stirred and turned over so as to expose new surfaces for reaction and absorption of heat and also will act as feeding means for gradually causing an advance or progression of the materials from the charging point to the discharging locus of the hearth. These stirring devices may be located at suitable intervals and preferably also have connected thereto additional stirring devices 36 in the form of small pieces of flat metal connected by means of flexible connectors such as chains 37 to the supports for the stirring devices, such that the metal pieces 36 will be dragged along the surface of the hearth so as to stir up the materials and also to conduct heat from the hearth to such materials, the metal pieces being normally in contact with the hearth will receive transmitted heat therefrom and in turn conduct the heat to the material contacted by the metal pieces 36. The flexible connectors 37 are such that they will writhe and contort so that the metal pieces will have a varied and irregular motion over the surface of the hearth and in the materials to be acted upon. At suitable intervals are also provided depending walls or partitions 38 suitably secured to the lower side of the cover 19 and carried thereby. The space between these partitions will define in the space above the hearth separated or independent compartments so that different reactions may be effected in the different compartments, although these compartments are moving compartments, and the effect may be progressive over the surface of the hearth from the charging to the discharging ends thereof. Metal pieces 36 and chains 37 may also be connected to the partitions to drag the metal pieces as in the case of those connected to the supports for the stirring means. The lower ends of the partitions may thus ride over the surface of the materials or extend a short distance therein depending upon the extent and rate of the movement of the materials that might be desired over the surface of the hearth.

Also at suitable intervals in the outer wall 1 of the kiln may be provided ducts 40 adapted to deliver into the space over the hearth or remove therefrom any substances, such as steam, gases and the like which might be used in the treatment of the materials on the hearth or for the removal of products of drying, evaporation or distillation. These ducts 40 are so located that a duct will communicate with each of the compartments between the partitions 38 so that while a given fluidal gas is introduced in one of the compartments, products of evaporation or distillation may be withdrawn from another compartment, depending upon the particular treatments to be made on the materials in the device. For example, the first duct near the charging point of the hearth may be used to conduct off moisture arising from the drying of the materials, the second duct may be for conducting away volatile gases arising from the materials to take it to a greater heat. The third duct may be used for the drawing off of other substances, such as products of distillation or for the introduction of a gas or suitable fluid for reaction with the materials, and a succeeding duct likewise performing the respective function depending upon whether certain materials or substances given off from the materials are to be drawn off or whether or not suitable reacting agents are to be supplied into the compartments formed between the partitions 38 and in the spaces confined thereby. The products of distillation or evaporation or both may be used, if desired, to supply fuel into the heating devices 4 and 5 thus effecting economy in the operation of the device.

In some cases it is desired to treat the materials before they are discharged from the hearth, with a gas such as steam or other fluids, under pressure. For this purpose the hearth may be provided with suitable depressions in which may be located a perforated jet device 41 through the perforations of which may be forced the steam or other gas into the powder as the same is caused to be fed over the device 41 toward the discharging grid 14.

In the operation of the device the materials to be treated are fed by the screw 13 into the trough 12 and the movement of the stirring devices 33, 34 and 35, together with the partitions 38 and the dragging elements 36 will cause the materials to be moved and fed over a surface of the hearth in a clockwise direction as appearing in Figures 1 and 3 of the drawings. As a compartment defined by the partitions 38, passes over the charging point and by the first duct 40, vapor arising by reason of the drying temperature or otherwise may be conducted off. When the compartment arrives at the second duct the higher temperature of the hearth may drive off volatile substances such as gases which may be conducted off through the second duct 40. When the compartment arrives at the third duct so that the distillation or other substances might be conducted off through that duct or if desired suitable fluids, gases or the like may be introduced through the duct so as to unite with the materials and act thereupon. Similarly as the compartment arrives at the successive remaining ducts, the latter may be utilized to draw off or to supply the desired materials. In the case where it is desired to treat the material with steam, the steam may be forced under pressure into the perforated device 41 so that the same may jet up through the materials being fed thereover toward the discharging grid 14. The exhausted materials may then fall into the hopper 15 and be fed out of the same by means of the screw 16. The hot gases of combustion from the heating devices 4 and 5 will pass under the hearth 10 in a counter-clockwise direction as viewed in Figures 1 and 3 of the drawings, and pass out through the flue 18 to the stack.

As an example of treatment, a method of treating ores such as iron ore low in magnetic constituents such as limonite or hematite or similar non-magnetic ores will be described here. Such an ore may be prepared by reducing the same to a suitable size as by grinding or pulverizing and mixing with it from 5 to 10 percent of carbonaceous or cellulose material such as fuel, in the ground or pulverized condition, and also such as lignite, sawdust, granulated wood refuse, or other similar material as peat, having in their composition a certain amount of volatile hydrocarbons and combined oxygen as well as a certain percentage of moisture. This mixture may then be fed over the hearth of the kiln and subjected to heat and the action if distillation will occur wherein the nascent deoxidizing gases liberated may change the limonite, hematite and similar ores, to a magnetic state admitting of the magnetic separation thereof. As the process progresses it will be apparent that the first heating of the material will drive off water vapor or the like which may be removed or drawn off through one of the ducts 40. For the driving off of the volatiles approximately 500 degrees centigrade is sufficient to cause a distillation and to produce a reducing atmosphere in the space above the hearth and in the proper compartment defined by the partitions 38, this will effect a partial oxidation of the distillates by reason of the oxygen contained in the carbonaceous and cellulose material and in turn this will start and produce a deoxidation of the ore being treated so as to reduce the same to a lower oxide of the ore such as magnetite. This action takes place very rapidly when the proper temperature has been reached and leaves a mixture of magnetite with a certain amount of impurities left in the ore and also incandescent carbon remaining from the fuel first mixed with the ore. In order to remove this carbon, steam or similar fluids may be introduced through the proper pipe or duct 40 or the perforated device 41 into a corresponding compartment so as to react upon the carbon and form carbon monoxide and hydrogen which are generally known under the name of water gas. The remaining ore residue may then be cooled and treated to a magnetic separation process to extract the metal parts or magnetic constituents. The volatile substances given off as a product of distillation from the mixture may be withdrawn through appropriate ducts 40 and utilized as a fuel in the heating devices. Waste heat from other furnaces or kilns may also be used as a heating medium.

While I have herein described and upon the drawings shown an illustrative form of kiln and also disclosed a specific process, it is to be understood that the invention is not limited thereto and may comprehend other constructions, details and arrangements of parts as well as other process steps and ingredients, than that mentioned, without departing from the spirit of the invention.

Having thus described my invention, I claim:

1. A heat treatment kiln comprising a hearth for holding the material to be treated, means for heating the hearth and the material thereon, a cover for and movable over said hearth, and sealing means between the movable cover and the hearth for maintaining the space over the hearth independent of outside.

2. A heat treatment kiln comprising a hearth for holding the material to be treated, means for heating the hearth and the material thereon, a cover for said hearth, means for causing said cover to travel over said hearth, means carried by said cover for stirring and feeding the material on the hearth, and means for sealing the space between the cover and hearth from the exterior.

3. A heat treatment kiln comprising a circular hearth, means for heating the hearth, a cover for the hearth, means for rotatably supporting said cover over the hearth, means actuated by the cover when rotated for feeding and stirring material on the hearth, and means for rotating the cover over the hearth and comprising a driving member passing about he periphery of the cover.

4. A heat treatment kiln comprising a circular hearth, means for heating the hearth, a cover for the hearth, means for rotatably supporting said cover over the hearth, means actuated by the cover when rotated for feeding and stirring material on the hearth, sealing means between the cover and the hearth for shutting off the interior space from the exterior, and means for rotating the cover over the hearth.

5. A heat treatment kiln comprising a hearth for holding the material to be treated, means for heating the hearth and the material thereon, a cover for said hearth, means for causing said cover to travel over said hearth, means carried by said cover for stirring and feeding the material on the hearth, and means for sealing the space between the cover and hearth from the exterior, said means comprising channels on the hearth for containing a fluidal material and fins on the cover extending into the material in said channels.

6. A heat treatment kiln comprising a circular hearth, means for heating the hearth, a cover for the hearth, means for rotatably supporting said cover over the hearth, means actuated by the cover when rotated for feeding and stirring material on the hearth, and means for rotating the cover over the hearth, said means comprising a flexible driving member passing about the periphery of said cover and adapted to rotate said cover.

7. A heat treatment kiln comprising a circular hearth, means for heating the hearth, a cover for the hearth, means for rotatably supporting said cover over the hearth, means actuated by the cover when rotated for feeding and stirring material on the hearth, and means for rotating the cover over the hearth, said means comprising a driving cable passing in a groove provided in the periphery of said cover and operable by a source of power.

8. A kiln comprising a hearth, means for subjecting the hearth to heat interchange, a feeding and stirring device movable over the hearth for feeding and stirring materials on the hearth to be treated, said device comprising spaced partitions for segregating spaces between the hearth and said device.

9. A kiln comprising an elongated hearth, means for heating the hearth, a cover movable over the hearth and adapted to provide a treatment space between said hearth and said cover, and means carried by the cover and adapted to divide said space into separate compartments for independent treatments of the materials therein.

10. A kiln comprising a circular hearth, means for heating the hearth, a cover for the hearth, means for rotating the cover over the hearth, and spaced walls depending from the cover and over the hearth for dividing the space over the hearth into independent treatment compartments.

11. A kiln comprising a hearth for the heat treatment of materials thereon, means movable over the hearth for feeding and stirring the materials on the hearth and for defining a treatment space over the hearth, means carried by the movable means and for dividing said space into separate compartments over the hearth for different treatments therein as the compartments progress over the hearth, and passages connected to said compartments for the introduction or carrying off of substances into or from the compartments.

12. A kiln comprising a refractory body having an annular channel, a hearth in said channel, means for heating the hearth, a movable cover for the channel and hearth whereby a treatment space is confined between the hearth and the cover in said channel, partitions carried by the cover and located in said space for dividing said space into a plurality of treatment compartments which progress as the cover moves, and ducts extending outward from said compartments.

13. A kiln comprising a circular hearth, a cover for the hearth, means for rotatably supporting the cover and having a central truncheon, and rollers for supporting the cover whereby it may move over the hearth.

14. A kiln comprising a hearth, means movable over the hearth and for feeding and stirring materials along and over the hearth, said means including metallic elements carried thereby and movable over the hearth and adapted to contact therewith for receiving heat therefrom for facilitating the conduction of heat to said materials.

15. A kiln comprising a hearth, a movable cover therefor, means for heating the hearth, means carried by the cover and adapted to divide the space over the hearth into independent compartments, and ducts in the side walls of the kiln and communicating at different points near and over the hearth for introducing treatment substances into certain of said compartments and for removing products of distillation from certain other of said compartments.

16. A kiln comprising a refractory body having an annular channel, a hearth in said channel, means for heating the hearth, a movable cover for the channel and hearth, means carried by said cover adapted to divide the channel into a plurality of compartments, and ducts in the walls of the kiln and communicating with said compartments for introducing treatment substances into certain of said compartments and for removing products of distillation from certain other of said compartments.

In witness whereof, I hereunto subscribe my name to this specification.

HENRY G. LYKKEN.